No. 846,148.  
PATENTED MAR. 5, 1907.  
H. M. SCHWARTZ.  
METHOD OF MAKING TOILET MIRRORS AND OTHER LIKE ARTICLES.  
APPLICATION FILED JULY 30, 1900.

Witnesses:
Oscar F. Hill
Edith J. Anderson

Inventor:
Herman M. Schwartz
By Macleod Calver & Randall
Attorneys

UNITED STATES PATENT OFFICE.

HERMAN M. SCHWARTZ, OF NORTHAMPTON, MASSACHUSETTS, ASSIGNOR TO FLORENCE MANUFACTURING COMPANY, OF NORTHAMPTON, MASSACHUSETTS, A CORPORATION OF MASSACHUSETTS.

METHOD OF MAKING TOILET-MIRRORS AND OTHER LIKE ARTICLES.

No. 846,148.     Specification of Letters Patent.     Patented March 5, 1907.

Application filed July 30, 1900. Serial No. 25,232.

*To all whom it may concern:*

Be it known that I, HERMAN M. SCHWARTZ, a citizen of the United States, residing at Northampton, in the county of Hampshire, State of Massachusetts, have invented a new and Improved Method of Making Toilet-Mirrors and other Like Articles, of which the following is a specification, reference being had therein to the accompanying drawings.

My invention has relation more especially to the manufacture of toilet-mirrors, hair-brushes, and other like articles, and has to do especially with the securing in place in the backing or frame the glass of a mirror or the brush-pad of a hair-brush, &c.

The invention will be fully understood from reference to the following specification and the accompanying drawings, in which I have illustrated two different modes of employing the invention.

The invention also is particularly pointed out and distinctly defined in the claim at the close of this specification.

Figure 1:
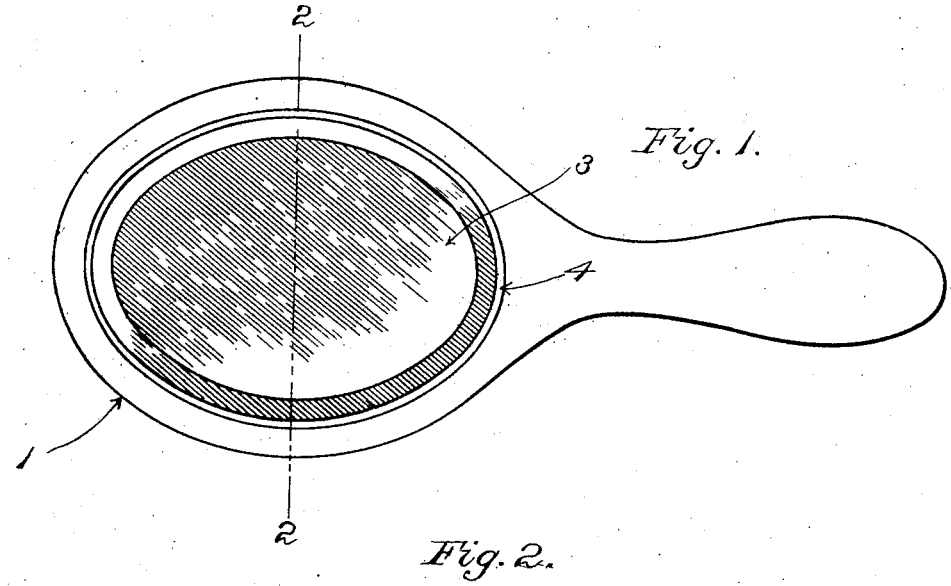
Figure 2:
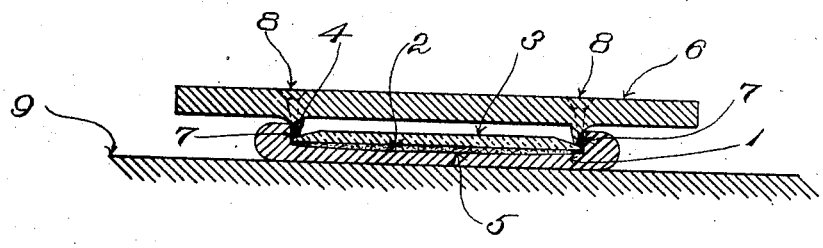
Figure 3:
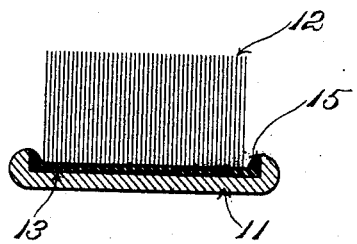

In the drawings, Figure 1 shows in plan a hand-mirror made in accordance with my invention. Fig. 2 is a sectional view of a mirror in process of manufacture, a support therefor, and a die such as may be used in carrying the invention into effect, the line of section being indicated at 2 2, Fig. 1. Fig. 3 is a sectional view of a hair-brush made in accordance with the invention.

At the present time in the manufacture of hand-mirrors the back is hollowed out for the reception of the glass, and after the latter has been put in place within the cavity of the back it is there secured by means of a rim or border which after being separately produced is applied over the edge of the glass and cemented to the outer wall of the said cavity. A great many mirrors are made having the backs thereof composed of wood. In the course of the manufacture it is practically impossible to form the cavities of different backs all of the same depth. The backs frequently become more or less warped or bent, and from shrinking or similar causes the cavities vary more or less in their shape and measurements. Variations occur also in the measurements of the pieces of glass which are prepared to be introduced into the cavities of the backs and in the thickness of the edges of the said pieces of glass. From these and other causes it follows that in the ordinary course of production after the glasses have been inserted into the cavities of the backs and the corresponding rims or borders have been applied and cemented in place there is more or less looseness or play of the glass, permitting it to move somewhat within its cavity beneath the rim or border and to shake or rattle therein. Similar disadvantages are experienced in the case of backs composed of plastic composition and molded into the required shape.

One special aim of my present invention is to enable the necessary processes of manufacture to be carried on more expeditiously and economically than heretofore. Another is to provide for securing the glass of a hand-mirror or the like firmly and immovably in place within the cavity of the back regardless of lack of perfection of fit, of ordinary variations in measurements and proportions, and of slight changes in the shape, &c., of the back resulting from shrinking, warping, &c.

Having reference to the drawings, 1, Figs. 1 and 2, designates the back of a toilet-mirror. 2, Fig. 2, is the cavity which is formed in the said back by hollowing out the latter in well-known manner. 3 is the sheet of glass which is seated in the said cavity, the said glass being shown as having its edges beveled, as commonly is the case in practice. 4 designates the rim or border by means of which the glass is secured in place within the cavity of the back. In accordance with my invention, after having introduced the glass 3 into the cavity 2 of the back 1, with the usual backing 5 of cotton or other suitable material interposed between the reverse face of the glass and the bottom of the cavity, I apply to the assembled parts the die 6, Fig. 2. The latter is shaped to fit against the upper surface of the glass, as shown in Fig. 2, leaving a narrow space at 7 around the edge of the glass adjacent the wall of the cavity 2. The die 6 is formed with one or more passages 8 therethrough communicating with the said narrow space. After having been assembled substantially as shown in Fig. 2 the parts of the mirror, together with the die, are introduced into a suitable molding-press—for example, such a press as is shown and described in United States Letters Patent granted to me July 24, 1900, No. 654,184—and plastic composition in a fluid state is made to flow, preferably under pressure, through the said passage-way or passage-ways 8 into the said narrow space 7 at the edge of the glass. The plastic composition which I employ contains shellac and is rendered plastic by heat. The bed-plate upon which the parts rest in the press is meant to be indicated at 9, Fig. 2. The die is arranged to fit tightly against the upper edge of the wall of the cavity in the back (see Fig. 2) in order to prevent escape of the composition onto the surface of the back outside the cavity.

The pressure upon the plastic composition is sufficient to cause the same to completely fill the space 7 and all interstices at the edge of the glass and to become firmly adherent to the surface of the glass and the surface of the back wherever it comes in contact with the two.

The rim or border produced and applied in the manner just disclosed effectually unites the glass to the back and secures the glass in place without the least possibility of loosening, all opportunity for movement of the glass, rattling, &c., being destroyed.

In Fig. 3 I have illustrated the utilization of my invention in connection with hair-brushes. In the same the brush-back is designated 11, the brush material is designated 12, the same being constituted herein of wires or pins, and the backing to which the said wires or pins are applied is designated 13, it being constituted of a sheet or sheets of cloth coated with rubber. In the process of making the brush the flexible backing 13 is placed in the cavity of the brush-back, a die corresponding in essential particulars with that above described is applied, substantially as indicated in Fig. 2, and plastic composition under pressure is forced into place substantially as above, thereby producing the permanently-attached rim or border 15, which is firmly adherent to the outer wall of the cavity in the brush-back and also to the flexible backing of the brush-pad, the said rim or border serving effectually to secure the brush-pad in place.

A rim or border made and applied in accordance with my invention becomes almost integrally united with the material of the back. It forms a practically invisible joint therewith, and the finish is superior to that ordinarily attainable when the usual course of procedure is followed.

What I claim is—

The improved method of manufacturing toilet-mirrors and the like articles, consisting in taking a back having formed therein the required cavity with raised sides, placing the facing-sheet within the said cavity with its edges in juxtaposition to the said sides, placing a die within the cavity above the sheet and in contact with the latter near its edge and also with the raised side of the cavity of the back, and flowing plastic composition into the space intervening between the die, the edge of the sheet, and the side of the cavity of the back, substantially as described.

In testimony whereof I affix my signature in presence of two witnesses.

HERMAN M. SCHWARTZ.

Witnesses:
 CHAS. F. RANDALL,
 WILLIAM A. COPELAND.